C. L. BARBER.
ANIMAL TRAP.
APPLICATION FILED OCT. 13, 1919.

1,372,927.

Patented Mar. 29, 1921.

Inventor:
C. L. Barber,
By L. M. Thurlow
Atty.

UNITED STATES PATENT OFFICE.

CONSTANCE L. BARBER, OF GLASFORD, ILLINOIS, ASSIGNOR OF ONE-HALF TO HENRY W. DUFIELD, OF GLASFORD, ILLINOIS.

ANIMAL-TRAP.

1,372,927.  Specification of Letters Patent.  Patented Mar. 29, 1921.

Application filed October 13, 1919. Serial No. 330,460.

*To all whom it may concern:*

Be it known that I, CONSTANCE L. BARBER, citizen of the United States, residing at Glasford, in the county of Peoria and State of Illinois, have invented certain new and useful Improvements in Animal-Traps; and I do hereby declare that the following is a full, clear, and exact description of the invention, which will enable others skilled in the art to which it appertains to make and use the same.

This invention pertains to animal traps. It relates more particularly to a trap designed particularly for catching moles.

One of the objects of the invention is to provide a trap of a form that will admit of its being placed in the runway or burrow made by the animal so that in the succeeding movements of such animal through the passage it must eventually enter the trap.

Another object is the provision of a trap of simple construction but extremely sensitive in that the animal having once entered will be caught without fail.

Another object is that the trap will have no portions at or inside the entrance that will be in the way of the animal to cause said animal to withdraw before being caught.

Besides the above objects the invention includes certain details of construction which will form the subject of certain of the claims herein.

To the end that the invention may be fully understood the accompanying drawing has been provided wherein, Figure 1 is a plan of one half of the trap shown within a burrow.

Figure 1:
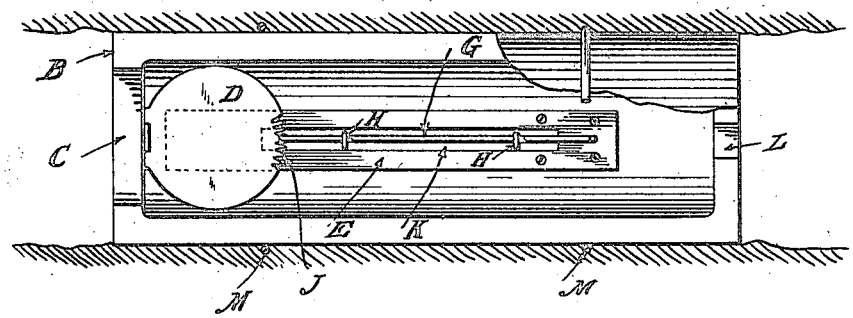

A and B indicate an upper and a lower half of the trap, respectively, such trap being divided into two separable parts, the line of separation being longitudinally and horizontally extended.

The halves are hollowed out to form a runway when the said halves are assembled and placed in the burrow made by the animal. The front end of the trap is preferably provided with an entrance opening C slightly smaller in diameter than the runway or bore thereof as clearly shown, in order that a door, flap, or closure D may be hinged in the angle created within the body, and so, also, that said door, flap or closure may lie against the annular wall portion thus created forming a stop therefor when the animal backs against it in an attempt to escape.

E is a flat spring secured at one end upon the floor of the body, or the portion B, said spring extending lengthwise of the trap. One end thereof lies beneath the door or closure D being free to rise and fall, its end remote from the said door or closure being that secured upon the floor as described.

G is a trigger consisting, for example, of a length of wire retained longitudinally of the trap by means of staples H, for example, which will permit said wire to either roll or shift longitudinally, or both. Its rear end or that within the rear end of the body is bent upwardly so as to lie in the path of the animal while its forward end is bent slightly upward and rests upon the adjacent edge of the door or closure when that member is open or brought down to the "set" position of the affair.

Preferably the said edge of the closure is serrated to create a series of projections or teeth J with any one of which the end of the wire is adapted to engage.

Though it may be otherwise constructed, the spring in the present instance is slotted longitudinally at K, the staples H and the wire G lying therein so as not to interfere with the flexing of said spring. The latter is so bent in the making thereof that its natural tendency is to spring up to the position shown in broken lines when released and since its end lies close to the hinge of the closure must necessarily raise that member to the position shown.

The rear closed end or wall of the trap is furnished with an opening L of use when the trap is employed for the purpose of catching rats. That is to say when placed in certain places through which rats habitually pass the opening L showing light beyond leads the rat onward into the trap into which it would not otherwise enter, but for use in mole trapping such opening L would not be necessary.

My form of trap is such that it can be constructed simply at little cost from the fact that it is made of two separable portions whereby the operating parts may all be secured in the bottom half B, and the act of setting it is quite easy from the fact that the upper half can be removed and the parts reached with perfect freedom. Likewise adjustments can be made with great positiveness by reason of the fact that such parts may all be seen and handled.

Any means may be used to secure the two halves of the trap together. As a simple manner of thus securing them I have provided a pair of rings or bands M which can be readily slipped on and off as occasion demands.

Figure 2:
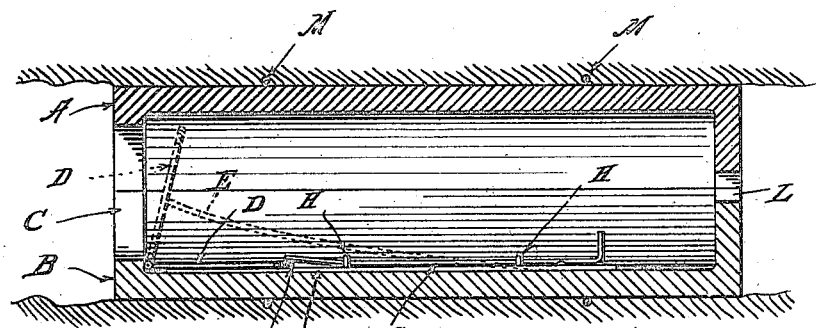
Fig. 2 is a longitudinal section of the same as seen from one side.
Figure 3:
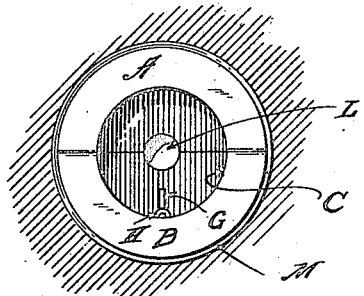
Fig. 3 is a front or end elevation of the trap.

In setting the trap the door or closure D is moved downwardly on its hinge thus depressing the spring E which then lies flat upon the floor. The trigger wire G is then placed upon one of the teeth J. By reason of the fact that the wire is inclined upwardly to engage the tooth, as shown in Fig. 2, it must be clear that any slight touch of the rear upturned end of the wire will roll said wire and move the inclined end thereof to a considerable extent be the rolling movement ever so slight. In other words, the inclined end in taking the form of a crank-shaped portion as it were, will partake of a considerable movement as compared with the movement of the wire on its axis. Thus the door or closure is always released. Again, should the animal abruptly strike the upturned end the wire can have endwise movement as well, thus moving its door-engaging end both laterally and longitudinally and therefore a positive release is assured at all times.

The spring lies flatly and solidly upon the floor of the trap and the door or closure lies squarely and flatly upon said spring and therefore the animal in passing over these parts will not disturb them nor the relation of the trigger and the closure. It is only when reaching and striking the upturned end of the trigger that action occurs to cause the release of the closure and this is after the animal is well inside or beyond said closure whereupon it is imprisoned. Its presence in the trap is known, of course, by the upheaval of the soil adjacent the entrance of the said trap, which soil is purposely trodden down after the trap is placed in position in the burrow.

The trap is made preferably of wood but may be of any other desired material.

The teeth J are spaced a sufficient distance apart so that in the rocking movement of the trigger the closure may be released, said teeth passing each side of the same.

An advantage in pivoting the closure on the bottom of the trap is that although it might only partially close for some reason or other the animal can not escape as is likely when a closure is hinged from the top of the trap as in some of the older types of traps.

I claim:

1. An animal trap consisting of a hollow body constituting a runway, a closure for one end hinged at the bottom of the body, a spring secured on the bottom having a free end adapted to engage the inner surface of the closure constantly tending to lift it to its closed position, a trigger mounted on the bottom, and means to retain it in position, said trigger adapted to have free movement in said means both axially and longitudinally, and adapted to engage and hold the closure in its open position against the action of the spring.

2. An animal trap consisting of a hollow body open at one end, a closure for the open end pivoted near the bottom of the opening, a spring secured on the bottom of the trap at one end, its other end being free, and lying beneath the closure at said free end, a trigger mounted on the bottom of the trap adapted to engage the closure holding the same in its open position upon the free end of the spring, the said trigger adapted to rock axially, and retaining means for said trigger.

3. An animal trap consisting of a hollow body open at one end, a closure pivoted at its edge at said opening and having serrations on its opposite edge, a spring lying upon the bottom of the trap, the closure adapted to lie thereon, a trigger extending longitudinally of and mounted on the bottom of the trap having one end bent away from the axis of the trigger and engaging at that end one of the teeth of the serrations, said trigger being free to rock axially.

4. An animal trap consisting of a hollow body open at one end, a closure pivoted at its edge at said opening and having serrations on its opposite edge, a spring lying upon the bottom of the trap, the closure adapted to lie thereon, a trigger extending longitudinally of the trap having one end bent away from the axis of the trigger and engaging at that end one of the teeth of the serrations, said trigger being free to rock axially and likewise free to move in a longitudinal direction and retaining means for said trigger.

5. An animal trap comprising a body tubular in form separated into two portions longitudinally having a closed and an open end, a closure for the open end secured in one of the portions, a spring to operate said closure, a trigger to secure the closure in its open position against the action of the spring, and retaining means for said trigger on the portion having the closure, said trigger adapted to rock on its axis and free to have longitudinal movement, and a member encircling the trap securing the two portions of the trap together.

In testimony whereof I affix my signature in presence of two witnesses.

CONSTANCE L. BARBER.

Witnesses:
L. M. Thurlow,
J. B. Wolfenbarger.